(12) United States Patent
Abraham et al.

(10) Patent No.: US 8,761,033 B2
(45) Date of Patent: Jun. 24, 2014

(54) METHOD AND APPARATUS FOR MULTI-STATION REQUEST MESSAGING

(75) Inventors: Santosh P. Abraham, San Diego, CA (US); Hemanth Sampath, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 12/541,757

(22) Filed: Aug. 14, 2009

(65) Prior Publication Data

US 2010/0329195 A1 Dec. 30, 2010

Related U.S. Application Data

(60) Provisional application No. 61/221,362, filed on Jun. 29, 2009.

(51) Int. Cl.
*H04L 1/00* (2006.01)

(52) U.S. Cl.
USPC .......................................... 370/252; 370/319

(58) Field of Classification Search
USPC ......... 370/329, 229, 230, 235, 252, 253, 319, 370/320, 321
See application file for complete search history.

(56) References Cited

U.S. PATENT DOCUMENTS

| | | | |
|---|---|---|---|
| 2005/0120097 A1 | 6/2005 | Walton et al. | |
| 2005/0147023 A1 | 7/2005 | Stephens et al. | |
| 2006/0256741 A1* | 11/2006 | Nozaki | 370/278 |
| 2008/0130538 A1* | 6/2008 | Raissinia et al. | 370/310 |
| 2008/0212701 A1 | 9/2008 | Pan et al. | |
| 2009/0097456 A1* | 4/2009 | Zhu et al. | 370/336 |
| 2009/0279486 A1 | 11/2009 | Kishigami et al. | |
| 2010/0157951 A1* | 6/2010 | Hahm et al. | 370/335 |

FOREIGN PATENT DOCUMENTS

| | | |
|---|---|---|
| CN | 1853374 A | 10/2006 |
| CN | 1894900 A | 1/2007 |
| CN | 101043493 A | 9/2007 |
| JP | 2006319676 A | 11/2006 |
| JP | 2006319959 A | 11/2006 |
| JP | 2007502074 A | 2/2007 |
| JP | 2007513571 A | 5/2007 |
| JP | 2007214920 A | 8/2007 |

(Continued)

OTHER PUBLICATIONS

Draft Standard for Information Technology-Telecommunications and information exchange between systems-Local and metropolitan area networks-Specific requirements Part 11: Wireless LAN Medium Access Control (MAC) and Physical Layer (PHY) specifications Amendment 5: Enhancements for Higher Throughput IEEE P802.11 n/D9.0, Mar. 1, 2009, XP002600869.

(Continued)

*Primary Examiner* — Dady Chery
(74) *Attorney, Agent, or Firm* — Steven R. Thiel

(57) ABSTRACT

A process for wireless communications is disclosed herein that includes specifying transmission parameters for a plurality of wireless nodes in a single frame; and transmitting the single frame. An apparatus for performing the process is also disclosed herein.

47 Claims, 12 Drawing Sheets

(56) References Cited

FOREIGN PATENT DOCUMENTS

| JP | 2009027645 A | 2/2009 |
|---|---|---|
| WO | WO2005015844 | 2/2005 |
| WO | 2005050875 A1 | 6/2005 |
| WO | 2005067169 A2 | 7/2005 |
| WO | 2006083139 A1 | 8/2006 |
| WO | 2007081683 A2 | 7/2007 |
| WO | WO2008002972 | 1/2008 |
| WO | WO2008115015 A1 | 9/2008 |
| WO | WO2010099494 | 9/2010 |

OTHER PUBLICATIONS

International Search Report and Written Opinion—PCT/US2010/040313, International Search Authority—European Patent Office—Sep. 29, 2010.
IEEE Standard for Local and metropolitan area networks Part 16: Air Interface for Broadband Wireless Access Systems;IEEE Std 802.16-2009 (Revision of IEEE Std 802.16-2004), IEEE Standard, IEEE, Piscataway, NJ, USA, May 29, 2009, pp. C1-2004, XP017604205, ISBN: 978-0-7381-5919-5 p. 358-p. 360.
Taiwan Search Report—TW099121285—TIPO—May 30, 2013.

\* cited by examiner

| FC | Duration | DA (broadcast) | SA | Common Information (CI) | Per STA Info (PSI) | CRC |
|---|---|---|---|---|---|---|
| 322 | 324 | 326 | 328 | 320 | 360 | 390 |

Common Information (CI) Fields 400

| 401 | 402 | 403 | 404 | 405 | 406 | 407 | 408 | 409 | 410 | 411 | 412 |
|---|---|---|---|---|---|---|---|---|---|---|---|
| TYPE | TXOP | Stacked CTS | MU-MIMO Sounding | CAL | Use Extended CP | Freq Offset Preset | CL Power Control | Ranging | MCS | OL Power Control | Target Rx Power |

Per STA Info (PFI) Fields 500

| | 501 | 502 | 503 | 504 | 505 | 506 | 507 | 508 | 509 | 510 | 511 |
|---|---|---|---|---|---|---|---|---|---|---|---|
| STA-1 | STA ID | #SS | Send CTS | Send SND | Send CQI | Freq. Offset Correction | Power Control | Ranging Time Offset | MCS | Backoff Counter | Transmission Time |
| STA-2 | STA ID | #SS | Send CTS | Send SND | Send CQI | Freq. Offset Correction | Power Control | Ranging Time Offset | MCS | Backoff Counter | Transmission Time |
| . | . | . | . | . | . | . | . | . | . | . | . |
| STA-n | STA ID | #SS | Send CTS | Send SND | Send CQI | Freq. Offset Correction | Power Control | Ranging Time Offset | MCS | Backoff Counter | Transmission Time |

[Selected Fields]

1102 MODULE FOR SPECIFYING TRANSMISSION PARAMETERS FOR A PLURALITY OF WIRELESS NODES IN A SINGLE FRAME

1104 MODULE FOR TRANSMITTING THE SINGLE FRAME

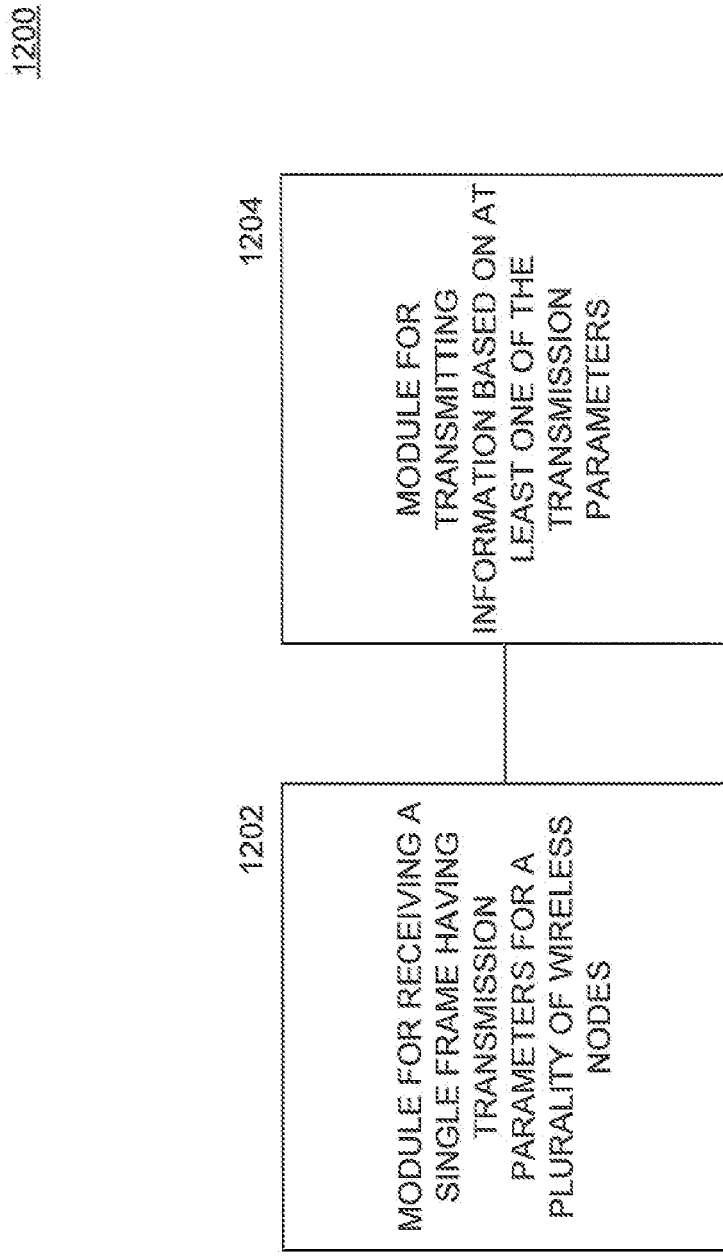

METHOD AND APPARATUS FOR MULTI-STATION REQUEST MESSAGING

CROSS-REFERENCE TO RELATED APPLICATIONS

Claim of Priority Under 35 U.S.C. §119

The present Application for Patent claims priority to Provisional Application No. 61/221,362, entitled "Method and Apparatus for Multi-Station Request Messaging" filed Jun. 29, 2009, and assigned to the assignee hereof and hereby expressly incorporated by reference herein.

BACKGROUND

I. Field

The following description relates generally to communication systems, and more particularly to a method and apparatus for multi-station request messaging.

II. Background

In order to address the issue of increasing bandwidth requirements that are demanded for wireless communications systems, different schemes are being developed to allow multiple user terminals to communicate with a single access point by sharing the channel resources while achieving high data throughputs. Multiple Input, Multiple Output (MIMO) technology represents one such approach that has recently emerged as a popular technique for the next generation communication systems. MIMO technology has been adopted in several emerging wireless communications standards, such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

In wireless communications systems, medium access (MAC) protocols are designed to operate to exploit several dimensions of freedom offered by the air link medium. The most commonly exploited dimensions of freedom are time and frequency. For example, in the IEEE 802.11 MAC protocol, the "time" dimension of freedom is exploited through the CSMA (Carrier Sense Multiple Access). The CSMA protocol attempts to ensure that no more than one transmission occurs during a period of potential high interference. Similarly, the "frequency" dimension of freedom can be exploited by using different frequency channels.

Recent developments have led to space as a dimension being a viable option to be used to increase, or at least more efficiently use, existing capacity. Spatial Division Multiple Access (SDMA) can be used for improving utilization of the air link by scheduling multiple terminals for simultaneous transmission and reception. Data is sent to each of the terminals using spatial streams. For example, with SDMA, a transmitter forms orthogonal streams to individual receivers. Such orthogonal streams can be formed because the transmitter has several antennas and the transmit/receive channel consists of several paths. Receivers may also have one or more antennas (MIMO, SIMO). For this example, it is assumed that the transmitter is an access point (AP) and the receivers are stations (STAs). The streams are formed such that a stream targeted at STA-B, for example, is seen as low power interference at STA-C, STA-D, . . . , etc., and this will not cause significant interference and most likely be ignored. In order to form these orthogonal streams, the AP needs to have channel state information (CSI) from each of the receiving STAs. Although CSI can be measured and communicated in several ways, thereby adding complexity, the use of CSI will optimize the configuration of SDMA streams.

Additional complexities arise when MIMO is applied to multi-user (MU) systems. For example, downlink and uplink protocols in MU-MIMO communications require control messages to initiate a downlink or uplink MU-MIMO epoch. Control messages will need to work with scheduling for sending control as well as data messages, and allocating resources.

Consequently, it would be desirable to address one or more of the deficiencies described above.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to apparatus and methods that provide wireless communications, where a method for wireless communications includes specifying transmission parameters for a plurality of wireless nodes in a single frame; and transmitting the single frame.

In another aspect, an apparatus for wireless communications is provided that includes a processing system configured to specify transmission parameters for a plurality of wireless nodes in a single frame; and transmit the single frame.

In yet another aspect, an apparatus for wireless communications is provided that includes means for specifying transmission parameters for a plurality of wireless nodes in a single frame; and means for transmitting the single frame.

In yet another aspect, a computer-program product for wireless communications is provided that includes a machine-readable medium comprising instructions executable to specify transmission parameters for a plurality of wireless nodes in a single frame; and transmit the single frame.

In yet another aspect, an access point is provided having one or more antennas; a processor configured to specify transmission parameters for a plurality of wireless nodes in a single frame; and a transmitter configured to transmit the single frame using the one or more antennas.

In yet another aspect, a method for wireless communications is provided that includes receiving a single frame comprising transmission parameters for a plurality of wireless nodes; and transmitting information based on at least one of the transmission parameters.

In yet another aspect, an apparatus for wireless communications is provided that includes a processing system configured to receive a single frame comprising transmission parameters for at least one wireless node and the apparatus; and transmit information based on at least one of the transmission parameters.

In yet another aspect, an apparatus for wireless communications is provided that includes means for receiving a single frame comprising transmission parameters for at least one wireless node and the apparatus; and means for transmitting information based on at least one of the transmission parameters.

In yet another aspect, a computer-program product for wireless communications is provided that includes a machine-readable medium comprising instructions executable to receive a single frame comprising transmission parameters for a plurality of wireless node; and transmit information based on at least one of the transmission parameters.

In yet another aspect, an access terminal is provided that includes one or more antennas; a receiver configured to receive a single frame comprising transmission parameters for at least one wireless node and the access terminal; and a transmitter configured to transmit information using the one or more antennas based on at least one of the transmission parameters.

In yet another aspect, an electronic card is provided that includes a receiver configured to receive a single frame comprising transmission parameters for at least one wireless node and the electronic card; and a transmitter configured to transmit information based at least one of the transmission parameters.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

FIG. 3 is a diagram of a control message frame configured in accordance with one aspect of the disclosure;

FIG. 4 is a diagram of a first portion of the control message frame of FIG. 3 configured in accordance with one aspect of the disclosure;

FIG. 5 is a diagram of a second portion of the control message frame of FIG. 3 configured in accordance with one aspect of the disclosure;

FIG. 11 is a block diagram illustrating the functionality of an apparatus for encoding data streams in accordance with one aspect of the disclosure; and FIG. 12 is a block diagram illustrating the functionality of an apparatus for returning channel information in accordance with one aspect of the disclosure.

DETAILED DESCRIPTION

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Downlink and uplink MU-MIMO protocols require control message to initiate a downlink or uplink MU-MIMO epoch. Typically, control messages should include parameters such as:
1. Schedules for uplink sounding;
2. Schedules for uplink data; and,
3. Spatial stream allocation (which should include correction information for STAs to refine channel estimates and/or such things as frequency offsets).

In addition, various implementation will need to support such features as reservations the medium by the STAs (including, for example, the sending of Clear to Send (CTS) messages), and accurate power control (including assigning specific power offsets to certain STAs).

In an aspect of the disclosure, a control message system that contains the features needed to communicate the various parameters for an uplink or downlink MU-MIMO transactions is provided. The system allows the AP to send a single control message to a plurality of stations with sufficient information for each station to be part of the MU-MIMO transaction. This single frame format is designed so that it can operate effectively for both uplink and downlink MU-MIMO communication. The control messages can be a MAC packet (header and payload) that can be included in a PHY-layer unit.

Figure 1:
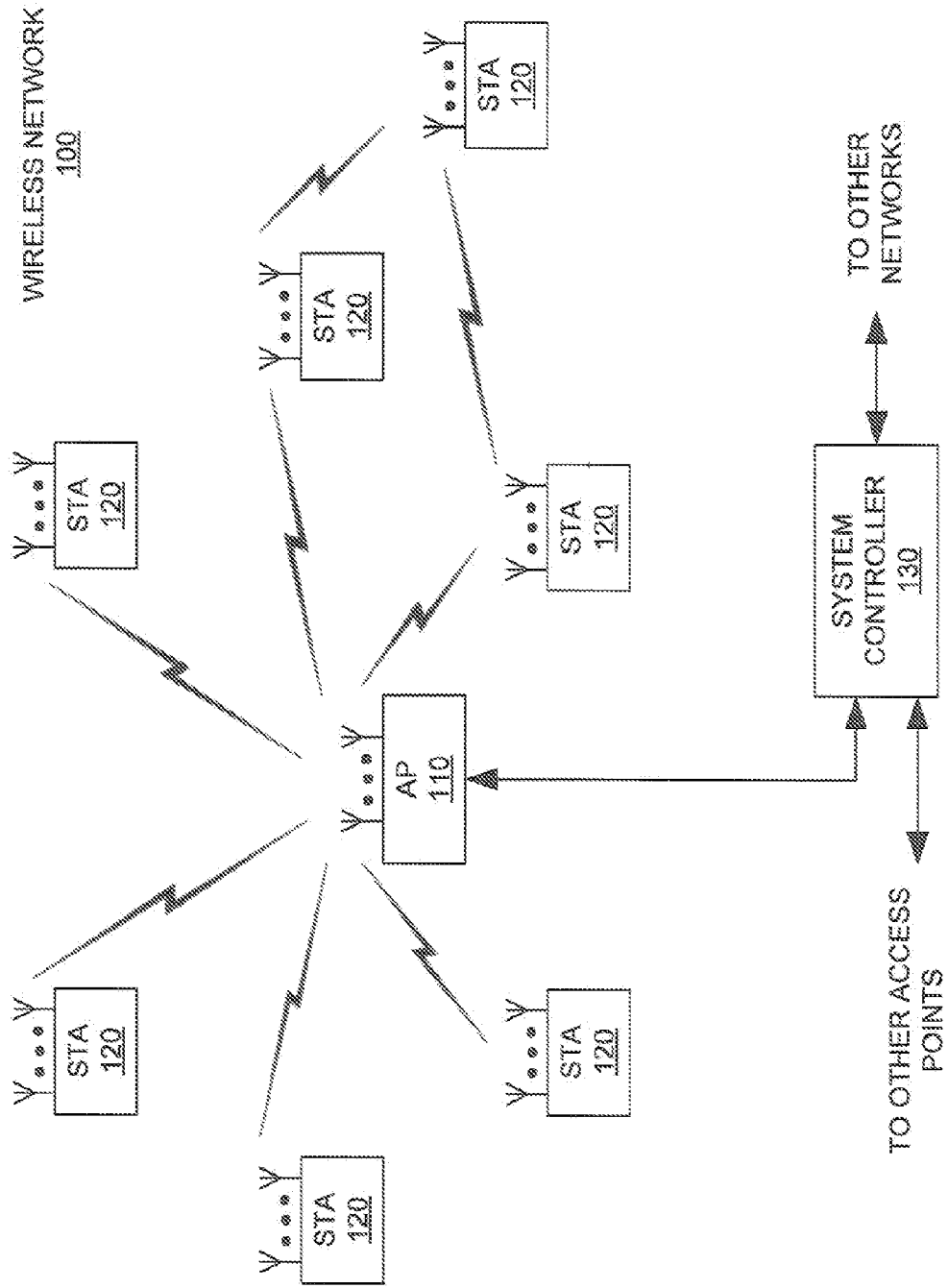
FIG. 1 is a diagram of a wireless communications network configured in accordance with an aspect of the disclosure.

Several aspects of a wireless network in which the control message system may be implemented will now be presented with reference to FIG. 1. The wireless network, which is also referred to herein as a basic service set (BSS) 100 is shown with several wireless nodes, generally designated as an access point 110 and a plurality of access terminals or stations (STAs) 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage. However, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple access terminals 120 simultaneously using Spatial Division Multiple Access (SDMA). SDMA is a multiple access scheme which enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enables each access terminal 120 to recover the data stream destined for that access terminal 120. On the uplink, each access terminal 120 transmits a spatially precoded data stream, which enables the access point 110 to identify the source of each spatially precoded data stream. It should be noted that although the term "preceding" is used herein, in general, the term "coding" may also be used to encompass the process of preceding, encoding, decoding and/or postcoding a data stream.

One or more access terminals 120 may be equipped with multiple antennas to enable certain functionality. With this configuration, for example, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the disclosure will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard.

Figure 2:
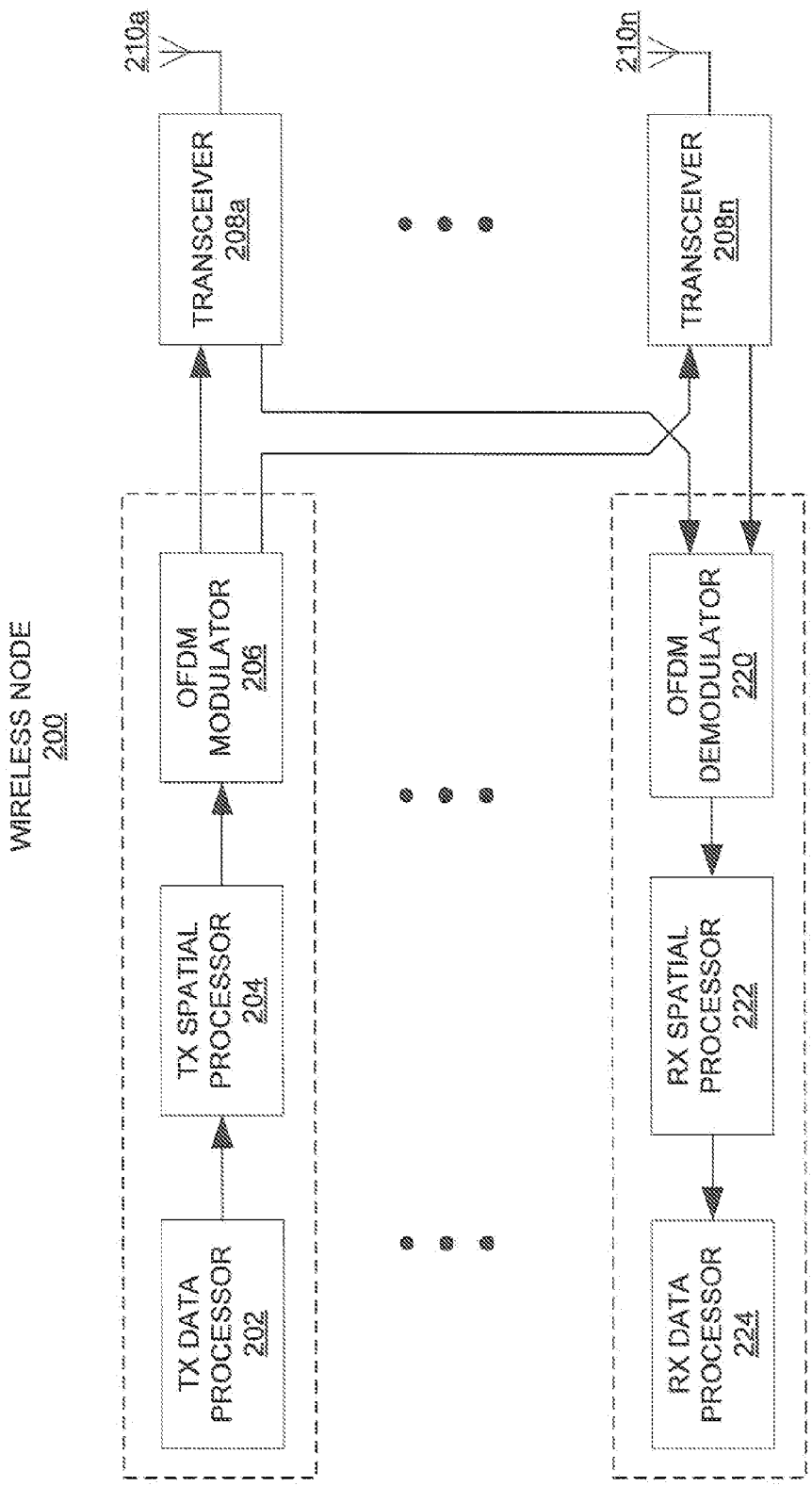
FIG. 2 is a wireless node that includes a front end processing system in a wireless node in the wireless communications network of FIG. 1.

FIG. 2 is a conceptual block diagram illustrating an example of the signal processing functions of the PHY layer. In a transmit mode, a TX data processor 202 may be used to receive data from the MAC layer and encode (e.g., Turbo code) the data to facilitate Forward Error Correction (FEC) at the receiving node. The encoding process results in a sequence of code symbols that that may be blocked together and mapped to a signal constellation by the TX data processor 202 to produce a sequence of modulation symbols.

In wireless nodes implementing OFDM, the modulation symbols from the TX data processor 202 may be provided to a TX spatial processor 204 that performs spatial processing of the modulation symbols. This may be accomplished by spatial precoding the modulation symbols before providing them to an OFDM modulator 206.

The OFDM modulator 206 splits the modulation symbols into parallel streams. Each stream is then mapped to an OFDM subcarrier and then combined together using an Inverse Fast Fourier Transform (IFFT) to produce a time domain OFDM stream. Each spatially precoded OFDM stream is then provided to a different antenna 210a-210n via a respective transceiver 208a-208n. Each transceiver 208a-208n modulates an RF carrier with a respective precoded stream for transmission over the wireless channel.

In a receive mode, each transceiver 208a-208n receives a signal through its respective antenna 210a-210n. Each transceiver 208a-208n may be used to recover the information modulated onto an RF carrier and provide the information to an OFDM demodulator 220.

In wireless nodes implementing OFDM, the stream (or combined stream) from the transceiver 208a-208n is provided to an OFDM demodulator 220. The OFDM demodulator 220 converts the stream (or combined stream) from time-domain to the frequency domain using a Fast Fourier Transform (FFT). The frequency domain signal comprises a separate stream for each subcarrier of the OFDM signal. The OFDM demodulator 220 recovers the data (i.e., modulation symbols) carried on each subcarrier and multiplexes the data into a stream of modulation symbols before sending the stream to a RX spatial processor 222.

The RX spatial processor 222 performs spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 200, they may be combined by the RX spatial processor 222.

A RX data processor 224 may be used to translate the modulation symbols back to the correct point in the signal constellation. Because of noise and other disturbances in the wireless channel, the modulation symbols may not correspond to an exact location of a point in the original signal constellation. The RX data processor 224 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 224 then uses the sequence of code symbol LLRs in order to decode the data that was originally transmitted before providing the data to the MAC layer.

The SDMA downlink protocol may include the following steps (1) Requesting and receiving channel state information (CSI) from all the potential SDMA receivers;
(2) Downlink SDMA packet construction and transmission, and Block Acknowledgement (ACK) transmission time specification; and
(3) Block ACK transmission by the SDMA transmission recipient stations (STAs) and Method for CSI estimation.

In one aspect of the disclosure, an approach for an AP communicating with multiple STAs using a single transmission will include the AP sending a multicast message to a plurality of STAs. Then, the AP specifies information requested in the multicast message, as well as the method and parameters to be used by the STAs in transmitting the requested information. In one aspect of the disclosure, the AP will determine the transmission time of the multicast message using EDCA, such as that specified in IEEE 802.11.

FIG. 3 illustrates a control message structure 300 that contains the structure needed to communicate the various parameters for an uplink or downlink MU-MIMO transaction. In one aspect of the disclosure, the control message structure 300 includes two portions: a first portion having control parameters for all STAs, and a second portion having control parameters specific to each STA. The structure allows the AP to send a single control message to a plurality of stations with sufficient information for each STA to be part of the MU-MIMO transaction. Thus, a single frame structure is designed to operate effectively for both uplink and downlink MU-MIMO communications.

In one aspect, the control message structure 300 includes the following common STA fields, also referred to as Common Information (CI) fields 320:

a. a Type field 401: Indicates a purpose of a request message;
b. a TxOP field 402: A time value-based on the type field—i.e., the utilization of the quantity in the TxOP field 902 depends on the type indication;
c. an stacked CTS field 403: Indicates if STAs are to transmit CTSs simultaneously (stacked) or serially (separated in time);
d. an MU-MIMO sounding field 404: Indicates if the STAs should send uplink sounding using MU-MIMO;
e. a CAL bit 405: Indicates if the ensuing frame exchange included calibration;
f. an Extended CP bit 406: Indicates if the response transmissions (excluding CTS) utilize extended CP;
g. an Frequency Offset Present field 407: Indicates that frequency offset correction is present in the per STA information;
h. a CL Power Control bit 408: When set indicates that power control offset is present in the per STA information field and is to be used of ensuing transmission from the selected STAs;
i. an Ranging bit 409: Indicates that per STA time offset information present in the per STA information field;
j. an MCS bit 410: When set, it indicates that MCS is specified per STA in the per STA information field;
k. an OL power control bit 411: When set, indicates that OL power control is to be used for the ensuing STA transmissions; and
l. a Target Rx Power 412: Indicates the target receive power.

In one aspect of the disclosure, as illustrated by FIG. 5, the control message structure includes the following STA specific fields, also referred to as a Per STA Info (PSI) fields 360, for STA-1 to STA-n:

a. an STA ID field 501: Indicates the identity of the stations;
b. an Stream Quantity field 502: Indicates a number of spatial streams for each STA;
c. an Send CTS bit 503: When set, indicates that STA must send a CTS;
d. an Send SND bit 504: When set indicates that the STA must send sounding;
e. an Send CQI bit 505: When set indicates that the STA must send CQI;
f. an Frequency Offset Correction bit 506: If present indicates frequency correction to be applied by the STA;
g. a Power Control bit 507: If present indicates, is used to compute the STA Tx Power;
h. an Ranging Time Offset bit 508: If present, is applied to STA tx times to ensure synchronized (range corrected) arrivals of uplink MU-MIMO transmissions at the AP;
i. an MCS bit 509: If present, suggests an MCS for STA transmissions;
j. a backoff counter value 510: If present, is used by the STA to contend for access using distributed control function by deferring transmissions for a number of idle slots that is given by the backoff counter value; and
k. a transmission time 511: If present, the STA transmits the information at the specified transmission time.

In various aspects of the disclosure, the information that is conveyed by the one or more of the bits that are described above may be communicated through the use of one or more fields that may include multiple bits. The control messaging structure will also support an approach where each STA determines the spatial stream index for uplink MU-MIMO response transmissions by utilizing the ordering of the STAs in the per station information field combined with other information present the common information field portion and per station information fields of the other STAs as well as its own per station information.

In one aspect of the disclosure, the STAs can determine the transmission time of serially transmitted responses by utilizing the ordering of the STAs in the per station information field combined with other information present the common information field and per station information fields of other STAs as well as its own per station information.

The control message structure can also support a method for the AP to select a subset of the STAs addressed in the per station information field for sending CTS frames, wherein the STAs are selected based on the receive SNR at the AP from transmissions at the STAs.

Obtaining accurate channel state information is a valuable part of the SDMA protocol as spatial streams are formed such that a stream targeted at a particular STA, for example, are seen as low power interference at other STAs. In order to form these non interfering streams, the transmitting node needs to have the CSI from each of the receiving STAs.

In one aspect, the transmitting node sends out a request message indicating that the CSI needs to be estimated. The request message is sent to a set of STAs that are potential SDMA transmission recipients. This message is referred to as a Training Request Message (TRM). In the disclosure contained herein, the control message structure 300 may be used as a TRM to obtain CSI at an SDMA transmitter using an implicit CSI exchange and an explicit CSI exchange.

The data portion of the control message structure 300 contains a STA information field 518 that includes the following information:

(1) STA-ID field 501: Lists the STAs 120 for which the CSI is to be estimated;
(2) # SS field 502: The number of spatial streams for each STA 120; and
(3) Ranging information field 508: Ensure that the sounding symbols arrive time aligned at the AP 110 to ensure accurate joint channel estimate.

The control message structure 300 also contains a target Rx Power field 412, which is the Rx power at which an STA's sounding frame should be received at the AP 110. In addition, the control message structure 300 also includes a calibration bit 405 that is used for an integrated downlink calibration procedure. Calibration is invoked at relatively large intervals to enable to AP 110 to update correction factors to be applied to the channel estimates.

In one aspect of the disclosure, each TRM is transmitted at a fixed transmit power since the STAs 120 use the transmit power of the TRM to estimate path loss and set transmit power for the uplink sounding frame. The TRM contains the legacy MAC header with the destination address set to the broadcast address in a DA (Broadcast) field 3. The destination address could also be set to a predefined multicast address. The transmission of each TRM is performed using backoff procedures, and in one aspect, the transmission may be performed using the procedures defined in the IEEE 802.11 MAC protocols for contention-based access.

A Duration/ID field 3 in the MAC header is set such that the entire SDMA transmission and the Block ACK reception are accounted for in the distance. In one aspect of the disclosure, each TRM is transmitted at the lowest legacy 802.11a/g rate so the all the STAs 120 in the wireless network 100 can set their NAV appropriately.

Once each of the STAs 120 that are listed in the TRM receives the TRM, they each respond with the CSI. In various aspects of the disclosure, multiple approaches may be used to provide an estimate of CSI after a TRM has been transmitted by the SDMA transmitter.

Figure 6:
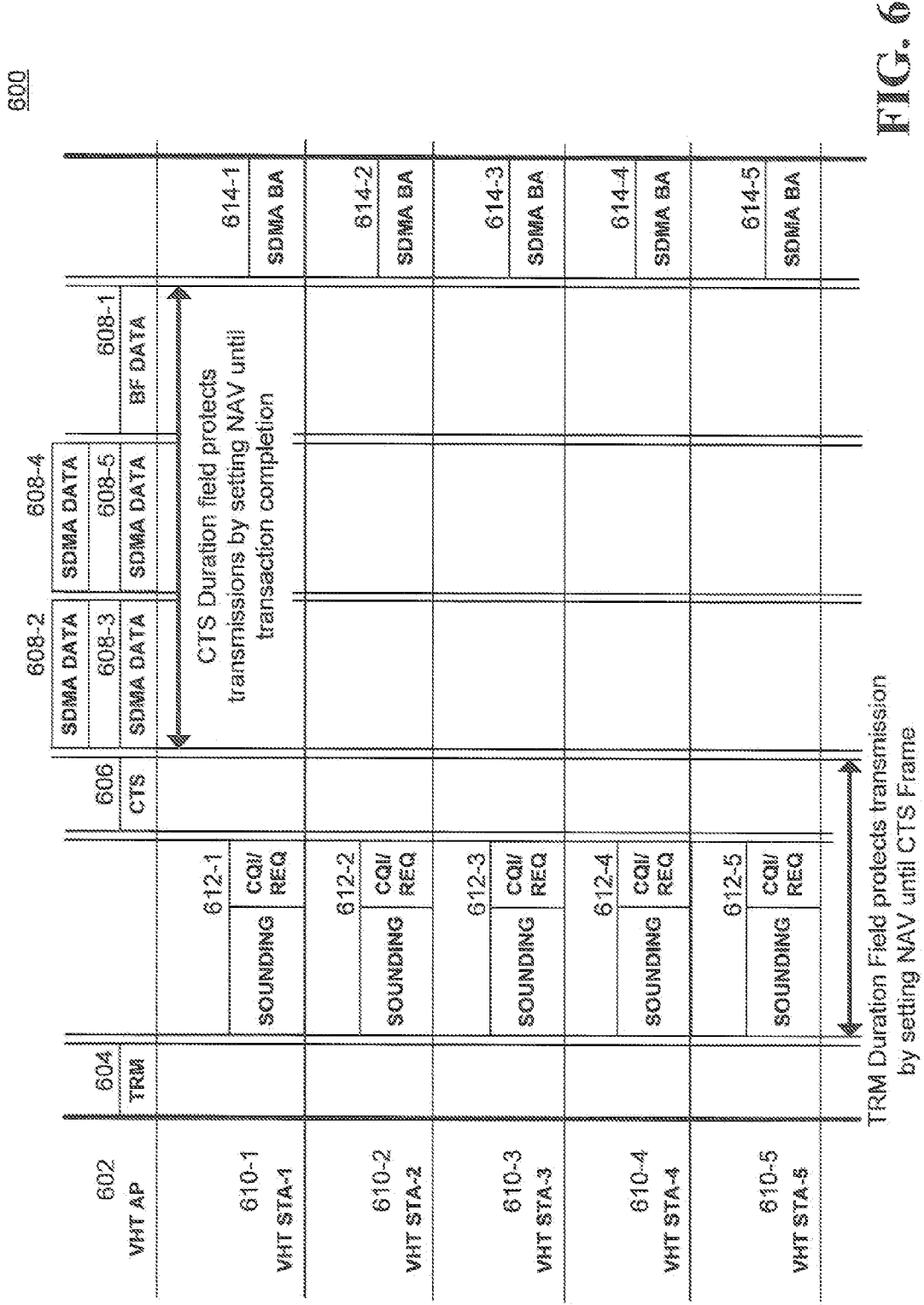
FIG. 6 is a timing diagram illustrating the operation of an SDMA protocol with implicit feedback based on the control message frame of FIG. 3.

In one approach, an implicit CSI feedback process is implemented, where each of the STAs 120 listed in the control message structure 300 sends a sounding frame in response receiving the TRM. The SDMA transmitter estimates the joint channel to the desired STAs from the received sounding frames. In this case, it is assumed that the channel is reversible and that calibration is necessary. An example of this approach is depicted in FIG. 6, where a plurality of STAs 610-1 to 610-5 sends respective sounding frame 612-1 to 612-5 in response to a TRM 604 transmitted from an VHT AP 602. Then, once a clear to send (CTS) 606 has been sent by the VHT AP 602 to protect the transmission of SDMA data 608-1 to 608-5 to each of the plurality of STAs 610-1 to 610-5, respectively, the plurality of STAs 610-1 to 610-5 can then each send respective block acknowledgements 614-1 to 614-5.

Figure 7:
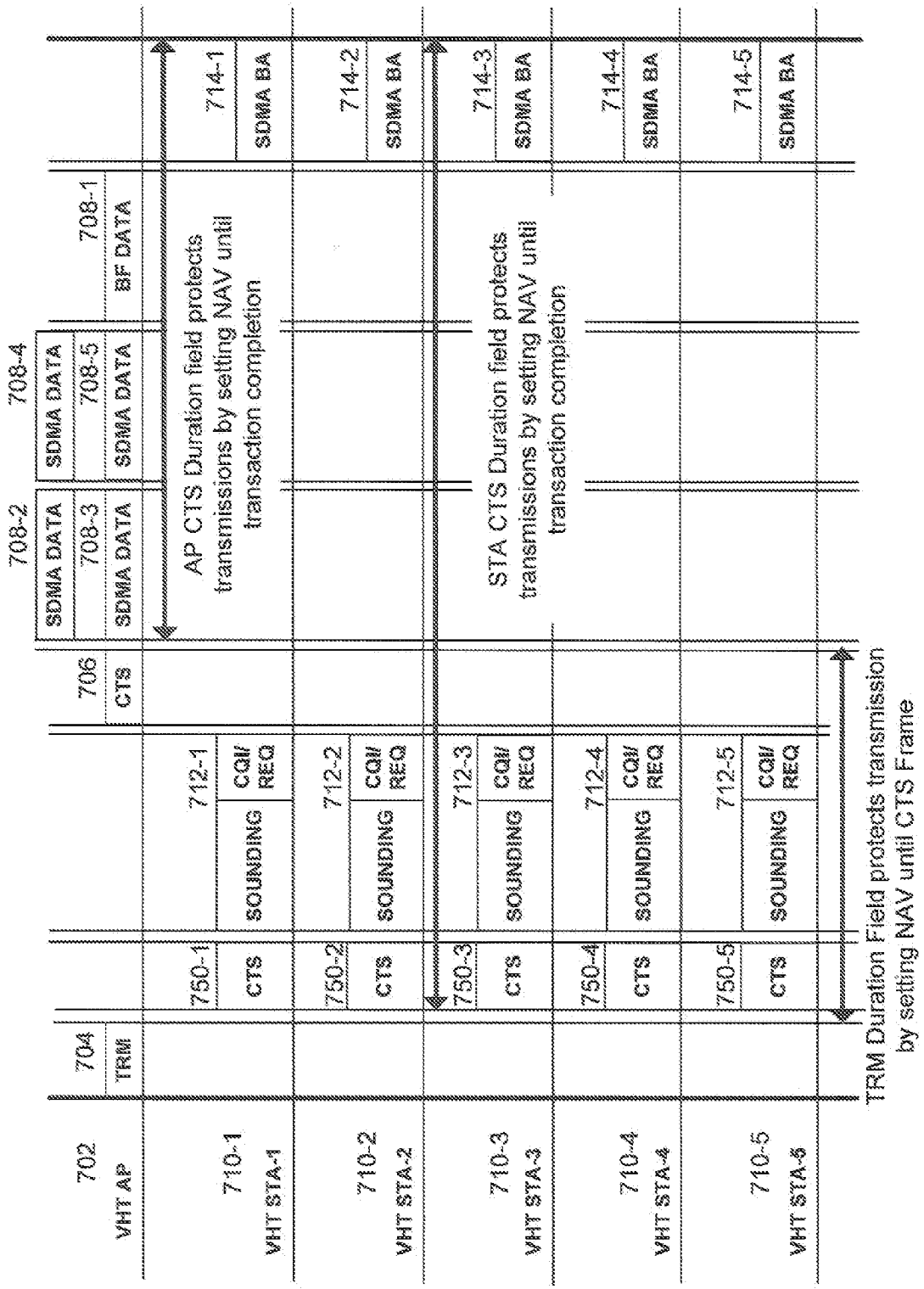
FIG. 7 is a timing diagram illustrating the operation of an SDMA protocol with implicit feedback based on the control message frame of FIG. 3 that includes a simultaneous transmission of a plurality of clear to send (CTS) transmissions.

In other aspects, a separate CTS transmission is performed prior to the transmission of the sounding frame to enhance the protection of individual stations. There are two separate approaches. Referring to FIG. 7, a plurality of CTSs 750-1 to 750-5 are used to enhance the protection of a plurality of sounding transmissions 712-1 to 712-5 transmitted from a plurality of STAs 710-1 to 710-5 in response to a TRM 704 transmitted from an VHT AP 702. As illustrated, the plurality of CTSs 750-1 to 750-5 are transmitted simultaneously before the plurality of sounding transmissions 712-1 to 712-5 are sent. Once a clear to send (CTS) 706 has been sent by the VHT AP 702 to protect the transmission of SDMA data 708-1 to 708-5 to each of the plurality of STAs 710-1 to 710-5, respectively, the plurality of STAs 710-1 to 710-5 can then each send respective block acknowledgements 714-1 to 714-5.

Figure 8:
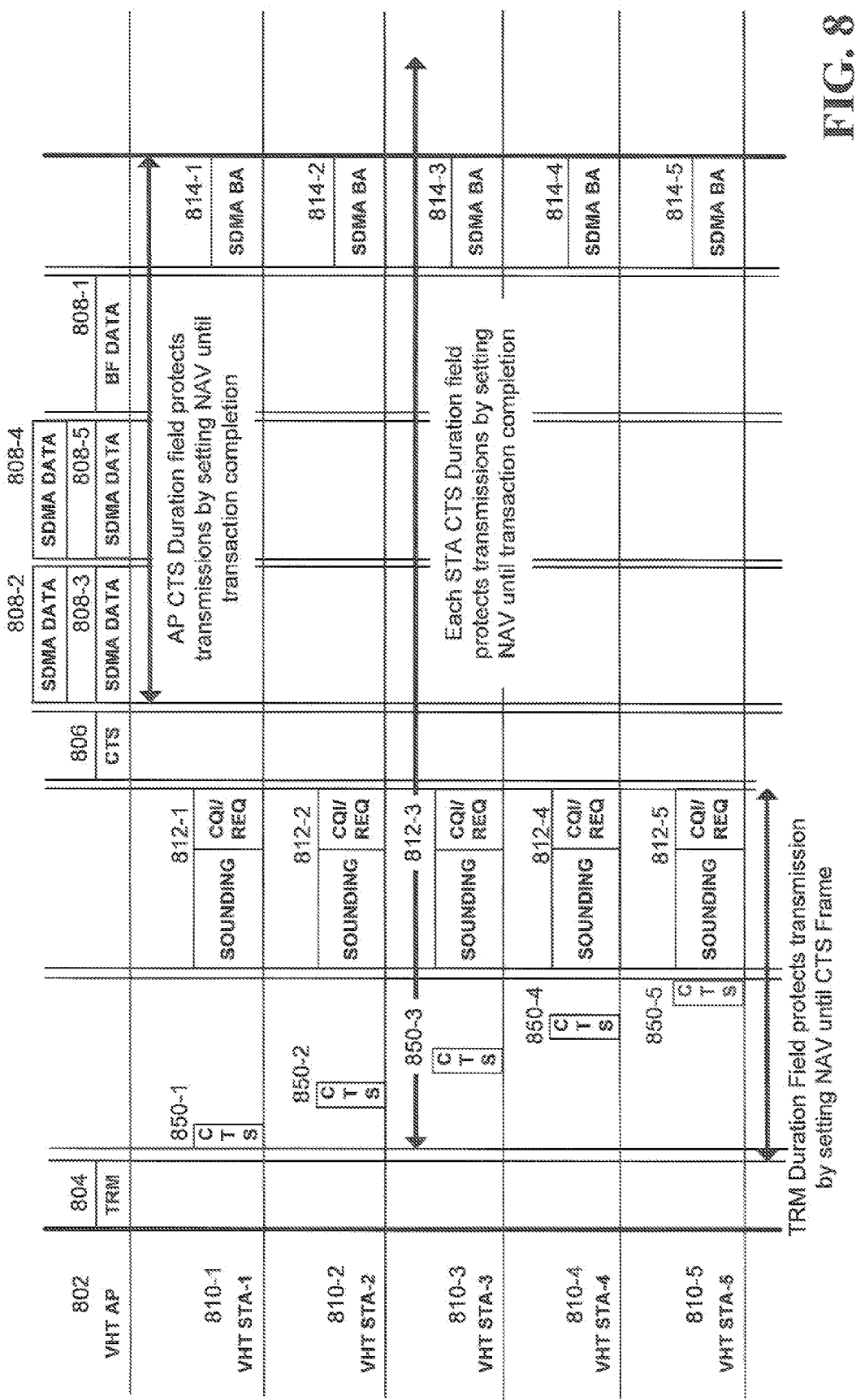
FIG. 8 is a timing diagram illustrating the operation of an SDMA protocol with implicit feedback based on the control message frame of FIG. 3 that includes a sequential transmission of a plurality of clear to send (CTS) transmissions.

Referring to FIG. 8, a plurality of CTSs 850-1 to 850-5 are used to enhance the protection of a plurality of sounding transmissions 812-1 to 812-5 transmitted from a plurality of STAs 810-1 to 810-5 in response to a TRM 804 transmitted from an VHT AP 802. As illustrated, the plurality of CTSs 850-1 to 850-5 are transmitted serially before the plurality of sounding transmissions 812-1 to 812-5 are transmitted. Then, once a CTS 806 has been transmitted by the VHT AP 802 to protect the transmission of SDMA data 808-1 to 808-5 to each of the plurality of STAs 810-1 to 810-5, respectively, the plurality of STAs 810-1 to 810-5 can then each send respective block acknowledgements 814-1 to 814-5.

Figure 9:
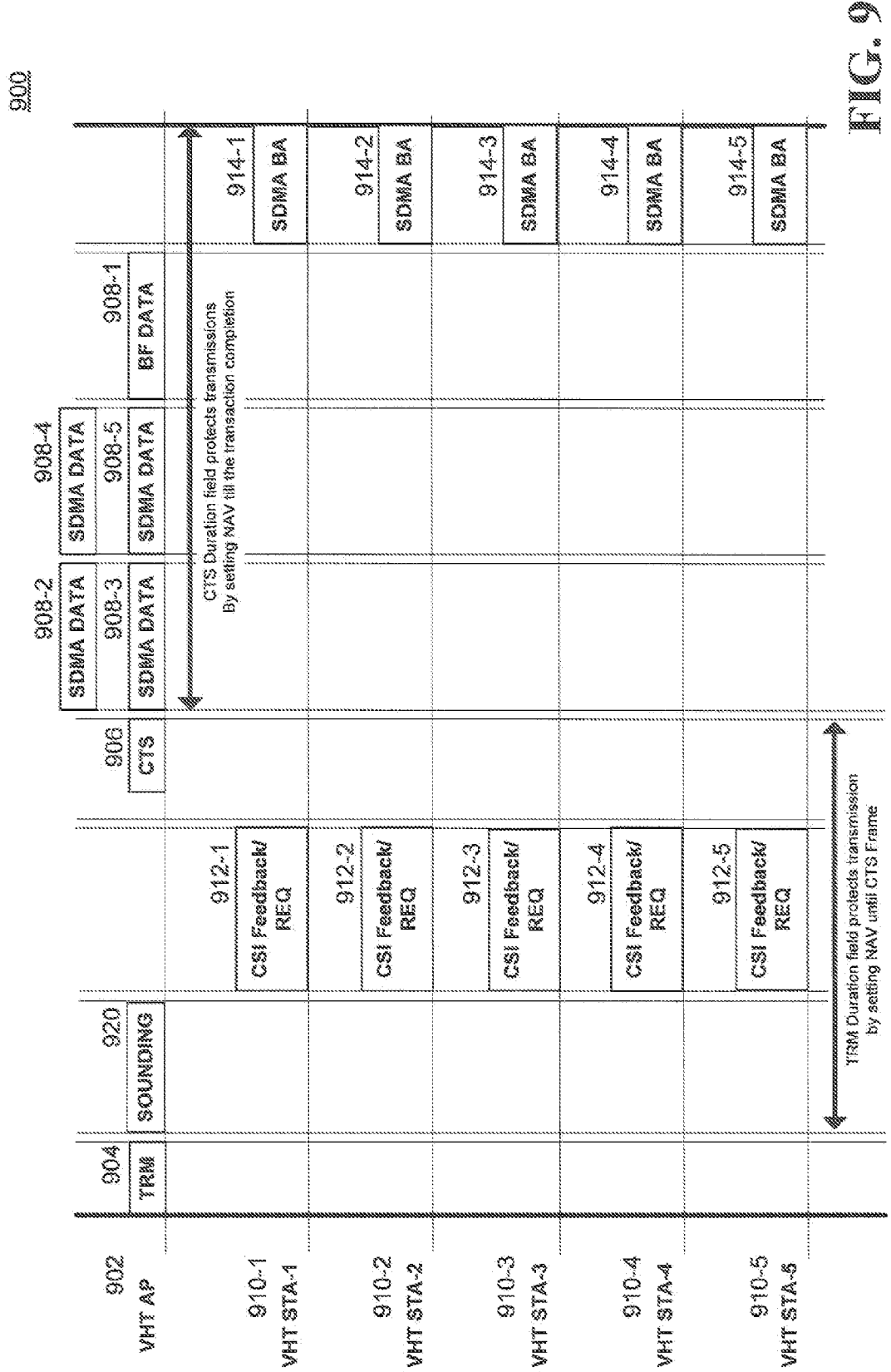
FIG. 9 is a timing diagram illustrating the operation of the SDMA protocol with explicit CSI feedback based on the control message frame of FIG. 3.

In another approach, as depicted in FIG. 9, an explicit CSI feedback process is implemented where, initially, an SDMA-capable transmitter such as an AP 902 sends a sounding frame 920 and a TRM 904. Each receiver that is identified by a list of STAs contained in the TRM 904 will compute the channel using the sounding frame 906 and then sends the CSI back to the TRM transmitter (i.e., the SDMA-capable transmitter of AP 902) in the data frame. The plurality of STAs are illustrated as STAs 910-1 to 910-5 and the plurality of CSI feedbacks are illustrated as CSI feedbacks 912-1 to 912-5. A CTS frame 906 is also used to protect the transmission of SDMA data 908-1 to 908-5 to each of the plurality of STAs 910-1 to 910-5, respectively. In one aspect of the disclosure, sounding frames such as the sounding frame 920 are not included as a part of any TRM in order to preserve co-existence with legacy systems.

Figure 10:
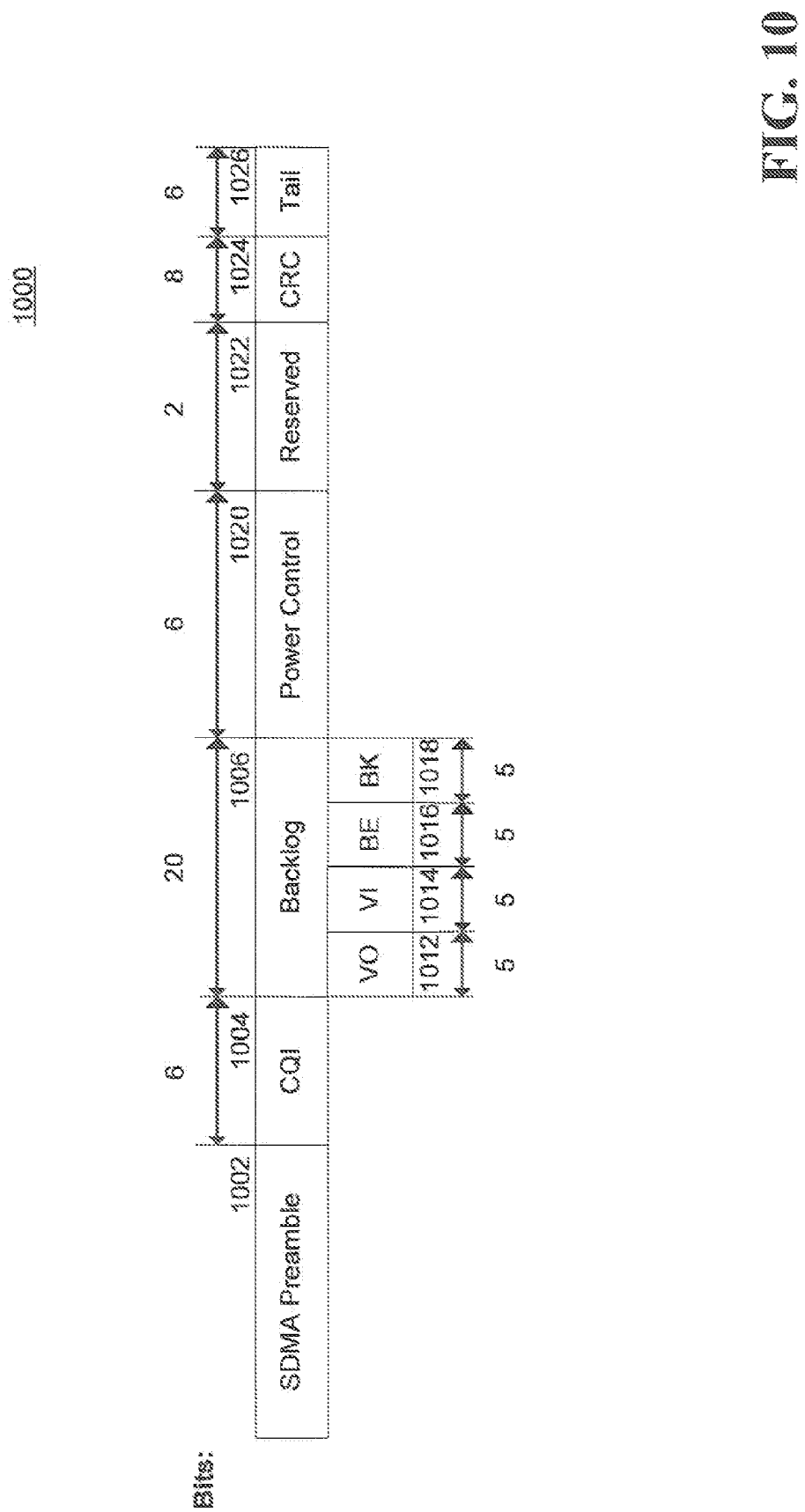
FIG. 10 is a diagram of a sounding frame that includes an SDMA preamble and control information determined by the spatial stream allocation based on the information contained in the control message frame of FIG. 3.

FIG. 10 illustrates a sounding frame 1000 that includes an SDMA preamble portion 1002 and a control information portion 1004-1026. In one aspect of the disclosure, the length of the SDMA preamble portion 1002 is determined by the spatial stream allocation specified in the TRM. The control information portion 1004-1026 provides the following information:

(1) Channel Quality Indicator (CQI) field 1004: The CQI field 1004 contains the per-antenna received SNR averaged across all Rx antennas and tones for a received TRM. This information allows the SDMA transmitter to construct a precoding matrix, if the matrix construction design is based on the MMSE criterion. The information contained in the CQI field 1004 also enables the SDMA transmitter to estimate the post detection signal to interference/noise ratio (SINR) and assign appropriate transmission rates for each responding STAs. In one aspect of the disclosure, the CQI can be measured by measuring a level of ambient noise surrounding the receiver during a quiet period;
(2) Uplink Traffic Backlog field 1006: The information contained in the Uplink Traffic Backlog field 1006 enables an SDMA transmitter to schedule uplink traffic epochs and/or assign reverse direction grants (RDG). The information contained in the Uplink Traffic Backlog field 1006 also facilitates the scheduler creating a tight schedule, thereby optimizing performance of the MAC protocol. In one aspect, the uplink traffic backlog is presented on a per class basis, and VO (voice), VI (video), BE (best effort), and BK (background) fields 612-618 denote four example priority classes; and (3) Power Control field 1020: The transmit power information contained in the power control field 1020 is filled in by an STA as described herein.

A CRC field 1024 for error correction, and a tail field 1026 is also included.

FIG. 11 is a diagram illustrating the functionality of an apparatus 1100 in accordance with one aspect of the disclosure. The apparatus 1100 includes a module 1102 for specifying transmission parameters for a plurality of wireless nodes in a single frame; and a module 1104 for transmitting the single frame.

FIG. 12 is a diagram illustrating the functionality of an apparatus 1200 in accordance with one aspect of the disclosure. The apparatus 1200 includes a module 1202 for receiving a single frame comprising transmission parameters for a plurality of wireless nodes; and a module 1204 for transmitting information based on at least one of the transmission parameters.

Those of skill will appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communications comprising:
    specifying transmission parameters for a plurality of wireless nodes in a single frame; and
    transmitting the single frame,
    wherein the transmission parameters comprise:
        a first portion comprising information intended for the plurality of wireless nodes; and
        a second portion comprising information being specifically identified for each one of the plurality of wireless nodes.

2. The method of claim 1, wherein the first portion comprises at least one of:
    a. a Type field;
    b. a Time Duration field with a time value based on the type field;
    c. a Stacked CTS field;
    d. an MU-MIMO sounding field;
    e. a CAL field;
    f. an Extended CP field;
    g. a Frequency Offset Present field;
    h. a CL Power Control field;
    i. a Ranging field;
    j. an MCS field; or
    k. an OL power control field.

3. The method of claim 1, wherein the second portion comprises at least one of:
    a. an STA ID field;
    b. a Stream Quantity field;
    c. a Send CTS field;
    d. a Send SND field;
    e. a Send CQI field;
    f. a Frequency Offset Correction field;
    g. a Power Control field;
    h. a Ranging Time Offset field;
    i. an MCS field;
    j. a backoff counter field; or
    k. a transmission time field.

4. The method of claim 1, wherein the transmission parameters comprise correction information for at least one of the plurality of wireless nodes.

5. The method of claim 1, wherein the transmission parameters comprise frequency offset information for at least one of the plurality of wireless nodes.

6. The method of claim 1, wherein the transmission parameters comprise power control information for at least one of the plurality of wireless nodes.

7. The method of claim 1, wherein the transmission parameters comprise MU-MIMO parameters.

8. An apparatus for wireless communications, comprising:
    a processing system configured to:
        specify transmission parameters for a plurality of wireless nodes in a single frame; and
        transmit the single frame,
        wherein the transmission parameters comprise:
            a first portion comprising information intended for the plurality of wireless nodes; and
            a second portion comprising information being specifically identified for each one of the plurality of wireless nodes.

9. The apparatus of claim 8, wherein the first portion comprises at least one of:
    a. a Type field;
    b. a Time Duration field with a time value based on the type field;
    c. a Stacked CTS field;
    d. an MU-MIMO sounding field;

e. a CAL field;
f. an Extended CP field;
g. a Frequency Offset Present field;
h. a CL Power Control field;
i. a Ranging field;
j. an MCS field; or
k. an OL power control field.

10. The apparatus of claim 8, wherein the second portion comprises at least one of:
a. an STA ID field;
b. a Stream Quantity field;
c. a Send CTS field;
d. a Send SND field;
e. a Send CQI field;
f. a Frequency Offset Correction field;
g. a Power Control field;
h. a Ranging Time Offset field;
i. an MCS field;
j. a backoff counter field; or
k. a transmission time field.

11. The apparatus of claim 8, wherein the transmission parameters comprise correction information for at least one of the plurality of wireless nodes.

12. The apparatus of claim 8, wherein the transmission parameters comprise frequency offset information for at least one of the plurality of wireless nodes.

13. The apparatus of claim 8, wherein the transmission parameters comprise power control information for at least one of the plurality of wireless nodes.

14. The apparatus of claim 8, wherein the transmission parameters comprise MU-MIMO parameters.

15. An apparatus for wireless communications, comprising:
means for specifying transmission parameters for a plurality of wireless nodes in a single frame; and
means for transmitting the single frame,
wherein the transmission parameters comprise:
a first portion comprising information intended for the plurality of wireless nodes; and
a second portion comprising information being specifically identified for each one of the plurality of wireless nodes.

16. The apparatus of claim 15, wherein the first portion comprises at least one of:
a. Type field;
b. a Time Duration field with a time value based on the type field;
c. a Stacked CTS field;
d. an MU-MIMO sounding field;
e. a CAL field;
f. an Extended CP field;
g. a Frequency Offset Present field;
h. a CL Power Control field;
i. a Ranging field;
j. an MCS field; or
an OL power control field.

17. The apparatus of claim 15, wherein the second portion comprises at least one of:
a. an STA ID field;
b. a Stream Quantity field;
c. a Send CTS field;
d. a Send SND field;
e. a Send CQI field;
f. a Frequency Offset Correction field;
g. a Power Control field;
h. a Ranging Time Offset field;
i. an MCS field;
j. a backoff counter field; or
a transmission time field.

18. The apparatus of claim 15, wherein the transmission parameters comprise correction information for at least one of the plurality of wireless nodes.

19. The apparatus of claim 15, wherein the transmission parameters comprise frequency offset information for at least one of the plurality of wireless nodes.

20. The apparatus of claim 15, wherein the transmission parameters comprise power control information for at least one of the plurality of wireless nodes.

21. The apparatus of claim 15, wherein the transmission parameters comprise MU-MIMO parameters.

22. A computer-program product for wireless communications, comprising:
a computer-readable storage device encoded with instructions executable to:
specify transmission parameters for a plurality of wireless nodes in a single frame; and
transmit the single frame,
wherein the transmission parameters comprise:
a first portion comprising information intended for the plurality of wireless nodes; and
a second portion comprising information being specifically identified for each one of the plurality of wireless nodes.

23. An access point, comprising:
one or more antennas;
a processor configured to specify transmission parameters for a plurality of wireless nodes in a single frame; and
a transmitter configured to transmit the single frame using the one or more antennas,
wherein the transmission parameters comprise:
a first portion comprising information intended for the plurality of wireless nodes; and
a second portion comprising information being specifically identified for each one of the plurality of wireless nodes.

24. A method for wireless communications comprising:
receiving a single frame comprising transmission parameters for a plurality of wireless nodes; and
transmitting information based on at least one of the transmission parameters,
wherein the transmission parameters comprise:
a first portion comprising information intended for the plurality of wireless nodes; and
a second portion comprising information being specifically identified for each one of the plurality of wireless nodes.

25. The method of claim 24, wherein the transmission parameters comprise an order of transmission.

26. The method of claim 24, wherein the transmission parameters comprise a spatial stream identifier.

27. The method of claim 26, wherein the spatial stream identifier is based on an order of transmission.

28. The method of claim 24, wherein the transmission parameters comprise a backoff counter value and further comprising contending for transmission based on the backoff counter value.

29. The method of claim 28, wherein the contending for transmission comprises deferring transmission for a number of idle slots.

30. The method of claim 27, wherein the transmission parameters comprise a transmission time and the information transmission comprises transmitting information at the transmission time.

31. An apparatus for wireless communications, comprising:
a processing system configured to:
receive a single frame comprising transmission parameters for at least one wireless node and the apparatus; and
transmit information based on at least one of the transmission parameters,
wherein the transmission parameters comprise:
a first portion comprising information intended for the at least one wireless node and the apparatus; and
a second portion comprising information being specifically identified for each one of the at least one wireless node and the apparatus.

32. The apparatus of claim 31, wherein the transmission parameters comprise an order of transmission.

33. The apparatus of claim 31, wherein the transmission parameters comprise a spatial stream identifier.

34. The apparatus of claim 33, wherein the spatial stream identifier is based on an order of transmission.

35. The apparatus of claim 31, wherein the transmission parameters comprise a backoff counter value and wherein the processing system is further configured to contend for transmission based on the backoff counter value.

36. The apparatus of claim 35, wherein processing system is further configured to defer transmission for a number of idle slots.

37. The apparatus of claim 31, wherein the transmission parameters comprise a transmission time and the processing system is further configured transmit information at the transmission time.

38. An apparatus for wireless communications, comprising:
means for receiving a single frame comprising transmission parameters for at least one wireless node and the apparatus; and
means for transmitting information based on at least one of the transmission parameters,
wherein the transmission parameters comprise:
a first portion comprising information intended for the at least one wireless node and the apparatus; and
a second portion comprising information being specifically identified for each one of the at least one wireless node and the apparatus.

39. The apparatus of claim 38, wherein the transmission parameters comprise an order of transmission.

40. The apparatus of claim 38, wherein the transmission parameters comprise a spatial stream identifier.

41. The apparatus of claim 40, wherein the spatial stream identifier is based on an order of transmission.

42. The apparatus of claim 38, wherein the transmission parameters comprise a backoff counter value and further comprising contending means configured to contend for transmission based on the backoff counter value.

43. The apparatus of claim 38, further comprising deferring means for deferring transmission for a number of idle slots.

44. The apparatus of claim 38, wherein the transmission parameters comprise a transmission time and the processing system is further configured transmit information at the transmission time.

45. A computer-program product for wireless communications, comprising:
a computer-readable storage device encoded with instructions executable to:
receive a single frame comprising transmission parameters for a plurality of wireless nodes; and
transmit information based on at least one of the transmission parameters,
wherein the transmission parameters comprise:
a first portion comprising information intended for the plurality of wireless nodes; and
a second portion comprising information being specifically identified for each one of the plurality of wireless nodes.

46. An access terminal, comprising:
one or more antennas;
a receiver configured to receive a single frame comprising transmission parameters for at least one wireless node and the access terminal; and
a transmitter configured to transmit information using the one or more antennas based on at least one of the transmission parameters,
wherein the transmission parameters comprise:
a first portion comprising information intended for the at least one wireless node and the access terminal; and
a second portion comprising information being specifically identified for each one of the at least one wireless node and the access terminal.

47. An electronic card, comprising:
a receiver configured to receive a single frame comprising transmission parameters for at least one wireless node and the electronic card; and
a transmitter configured to transmit information based at least one of the transmission parameters,
wherein the transmission parameters comprise:
a first portion comprising information intended for the at least one wireless node and the electronic card; and
a second portion comprising information being specifically identified for each one of the at least one wireless node and the electronic card.

* * * * *